Patented Apr. 25, 1950

2,505,568

UNITED STATES PATENT OFFICE 2,505,568

CATALYTIC OXIDATION OF HETEROCYCLIC AROMATIC NITROGEN COMPOUNDS

Max B. Mueller, Dumont, N. J., assignor to Allied Chemical & Dye Corporation, New York, N. Y., a corporation of New York No Drawing. Original application November 21, 1944, Serial No. 564,553. Divided and this application September 9, 1947, Serial No. 773,076

5 Claims. (Cl. 260—295.5)

1

This invention relates to the production of pyridine carboxylic acids by catalytic oxidation of heterocyclic aromatic nitrogen compounds having an oxidizable organic grouping attached to the nitrogen-containing aromatic nucleus by one or more carbon-to-carbon linkages; more particularly it relates to the production of nicotinic acid from compounds of the type described.

This application is a division of my copending application Serial No. 564,553, filed November 21, 1944 now U. S. Patent No. 2,449,906.

Copending application Serial No. 461,417, now Patent No. 2,476,004, July 12, 1948, filed in the name of W. O. Teeters October 9, 1942, discloses the oxidation of such heterocyclic nitrogen compounds by subjecting to elevated temperatures a mass formed by the admixture of such a compound with sulfuric acid and a substance selected from the group consisting of halogens, hydrogen halides and halogen containing compounds which react with sulfuric acid at 50° C. to yield free halogens or hydrogen halides.

My present invention is in the nature of an improvement upon the process described in the above identified Teeters application, which improvement permits a substantial reduction in the optimum temperature ranges employed in the oxidation of the heterocyclic aromatic nitrogen compounds.

The object of this invention is, therefore, to provide a new and improved process for the oxidation of heterocyclic aromatic nitrogen compounds having an oxidizable organic grouping attached to the nitrogen-containing aromatic nucleus by one or more carbon-to-carbon linkages.

In accordance with my invention an N-heteroaryl compound having an oxidizable organic grouping attached to the nitrogen-containing aromatic nucleus by one or more carbon-to-carbon linkages is oxidized to a pyridine carboxylic acid by reacting a solution of the compound in sulfuric acid, said solution containing a relatively small amount of a halogen substance as defined above which catalyzes oxidation of the N-heteroaryl compound to a pyridine carboxylic acid, with nitric acid.

Oxidation of the N-heteroaryl compounds above described in accordance with this invention produces highly valuable pyridine carboxylic acid in excellent yields. Furthermore, the optimum temperature ranges for the oxidation are substantially lower than those employed in oxidizing the same compound with sulfuric acid in the presence of the same catalyst. For example, oxidation of 3-picoline to nicotinic acid with sulfuric acid in the presence of a halogen catalyst according to the process described by Teeters is preferably carried out at a temperature between 305° and 315° C., while oxidation of 3-picoline in the presence of such catalyst in accordance with this invention is most advantageously done at 250° to 260° C. Accordingly, my invention permits production of the desired pyridine carboxylic acids at considerably lower cost.

The term "N-heteroaryl compound" is employed throughout the specification and claims to denote those heterocyclic compounds which contain in their structure a nucleus formed by the replacement of one

group of an aromatic nucleus by a nitrogen atom.

My invention is applicable to the oxidation of any N-heteroaryl compound having an oxidizable organic grouping attached to the nitrogen-containing aromatic nucleus by one or more carbon-to-carbon linkages. Thus, the picolines, lutidines, collidines, quinoline, hydroxy-quinolines, quinoline sulfonic acids, quinaldine, isoquinoline, lepidine and nicotine may be treated in accordance with this invention. The nature of the product obtained depends upon the N-heteroaryl compound oxidized and, in some cases, upon the temperature at which the oxidation is carried out. Thus, oxidation of 3-picoline or nicotine yields nicotinic acid. Oxidation of quinoline or 8-hydroxy-quinoline at temperatures above 190° C. yields chiefly nicotinic acid, but at temperatures substantially below this value, quinolinic acid is the principal product. Oxidation of 2-picoline yields picolinic acid, and oxidation of 4-picoline yields isonicotinic acid; oxidation of isoquinoline yields cinchomeronic acid. Oxidation of quinaldine at temperatures above about 190° C. yields chiefly pyridine-2,5-dicarboxylic acid, but oxidation of quinaldine at temperatures substantially below this value yields 2-methyl pyridine-5,6-dicarboxylic acid. A preferred embodiment of my invention involves the oxidation of quinoline or 3-picoline to nicotinic acid, since the quinoline and 3-picoline reactants are available or potentially available in large amounts and the product obtained is the most valuable of the pyridine carboxylic acids at the present time. The N-heteroaryl compounds treated may be in substantially pure condition, or in crude form as recovered from coal tar by conventional procedures.

The sulfuric acid employed is preferably concentrated sulfuric acid such as 66° Bé. acid, but more dilute acid such as 60° Bé. acid may be used, or, less desirably, fuming sulfuric acid. The amount of sulfuric acid employed may vary considerably but should be sufficient to both combine with the basic nitrogen atom of the N-heteroaryl compound and maintain the compound in solution at the temperature of oxidation; generally between about 5 and about 8 mols of sulfuric acid per mol of N-heteroaryl compound to be treated is suitable.

The catalyst employed in accordance with this invention may be any of the catalysts described in the copending Teeters application hereinabove referred to.

In utilizing the catalysts of the Teeters application, the particular mode of addition of the catalyst to the reaction mixture depends upon the nature of the catalytic material to be employed. Thus, for example, if a gaseous substance such as chlorine, hydrogen chloride or hydrogen bromide is to be employed as the catalyst, it may be added to the reaction mixture by introducing the gas through a suitable distributor below the surface of the reaction mixture. In the case of a liquid substance such as free bromine, the catalyst may be slowly added to the reaction mixture, preferably with good agitation. In the case of a solid catalyst, such as iodine or metal halides such as sodium or potassium bromide, the entire amount of the catalyst to be employed may be added to the reaction mixture at the start of the reaction, but preferably the catalyst is gradually added to the mixture throughout the course of the oxidation. Among the materials preferably employed as catalysts are chlorine, bromine, iodine, hydrogen chloride, hydrogen bromide, hydrogen iodide, iodic acid and other iodine oxides, iodine monochloride and other mixed halogen compounds, alkali metal chlorides, bromides or iodides, or mixtures of such substances. Preferably, these materials are added to the reaction mixture together with another catalytic material such as mercury, a mercury compound soluble in sulfuric acid, a mixture of mercury and copper compounds soluble in sulfuric acid, selenium or a selenium compound soluble in sulfuric acid; a particularly suitable catalyst may be formed by the addition of a selenium compound soluble in sulfuric acid and an alkali metal bromide such as sodium or potassium bromide to the reaction mixture in proportions such that the amount of the selenium compound is equivalent to from 0.5 to about 2.0 atoms of selenium per atom of bromine contained in the bromide. The amount of halogen catalyst employed may vary widely but generally between about 0.5 and about 25% by weight of the N-heteroaryl compound treated is suitable.

In general the catalysts above mentioned may be used for the oxidation of any N-heteroaryl compound having an oxidizable organic grouping attached to the nitrogen-containing aromatic nucleus by one or more carbon-to-carbon linkages. However, I have found that a halogen catalyst, particularly when combined with a selenium catalyst, is eminently adapted for the oxidation of the alkyl substituted pyridines such as 3-picoline.

In carrying out the process of my invention, the N-heteroaryl compound to be oxidized may be dissolved in the sulfuric acid, the catalyst added, and the mixture then heated to reaction temperature; gradual addition of the nitric acid is then commenced and the addition of nitric acid continued until oxidation is substantially complete, which may be determined by analysis of a portion of the reaction mass or by a marked increase in the evolution of brown oxides of nitrogen. Nitric acid containing from about 50% to about 75% $HNO_3$ is preferably employed although acid of other concentrations may be used if desired.

The temperature at which the oxidation is carried out may vary considerably, depending upon the N-heteroaryl compound treated, upon the catalyst employed and, in some cases, upon the desired pyridine carboxylic acid. The following table indicates optimum temperature ranges for carrying out various oxidations in accordance with preferred embodiments of my invention; in the table the abbreviation "Hal" denotes the halogen catalysts of the Teeters application.

| Compound Oxidized with Hal Catalyst | Product | Optimum Temperature Range |
|---|---|---|
| Quinoline | Nicotinic Acid | 215° to 225° C. |
| Methyl pyridines | Corresponding Acid | 250° to 260° C. |

In general it may be said that when employing a halogen catalyst for the oxidation of polynuclear N-heteroaryl compounds in accordance with a preferred embodiment of my invention temperatures between 215° and 225° C. are most suitable, unless quinolinic acid or 2-methylpyridine-5,6-dicarboxylic acid is to be produced, in which cases temperatures between about 150° and 170° C. should be used. Oxidation of methyl pyridines is preferably carried out at 250° to 260° C. Broadly, temperatures anywhere between 100° and 300° C. will effect oxidation of the N-heteroaryl compounds in accordance with my invention.

While the method of carrying out the oxidation above described represents the preferred embodiment of my invention, the oxidation may also be carried out by gradually adding to sulfuric acid maintained at reaction temperature a solution containing the N-heteroaryl compound to be oxidized dissolved in the nitric acid, the catalyst being in solution, either in the nitric acid or in the sulfuric acid.

The pyridine carboxylic acid product obtained as a result of the oxidation may be recovered in any suitable manner. In the case of nicotinic acid, produced in accordance with the preferred embodiment of this invention, the acid reaction mixture containing sulfuric acid, nicotinic acid sulfate and the catalyst may be cooled to room temperature and poured into water or ice; the sulfuric acid may then be partially neutralized with an alkaline material such as ammonia and any precipitate which forms removed by filtration. The pH value of the solution may then be raised to between about 5 and about 7 by adding sufficient alkali, or by adding an excess of ammonia thereto and boiling until the solution becomes acid to litmus, and the nicotinate converted into copper nicotinate by reaction with copper sulfate; the copper nicotinate precipitate may be recovered by filtration and converted by reaction with sodium hydroxide into sodium nicotinate. Nicotinic acid is preferably recovered from the sodium nicotinate by the addition of an acid such as hydrochloric or sulfuric acid to the sodium nicotinate solution until the pH value thereof is between about 3 and about 4, preferably between about 3.4 and about 3.6, and cooling, since I have found maximum yields of nicotinic acid may thereby be obtained; a Brom Phenol Blue indicator may be used in adjusting the pH value since the neutral point of this indicator to nicotinic acid, i. e. the point at which the indicator just turns yellow, is within the ranges above mentioned. The nicotinic acid may also be recovered by decomposing the copper nicotinate with hydrogen sulfide, filtering off the copper sulfide thus formed and recovering nicotinic acid from the filtrate. Cinchomeronic acid may be advantageously recovered from the reaction mixture resulting from oxidation of isoquinoline by cooling the mixture, partially neutralizing, adjusting the pH value of the solution to between 1 and 2, preferably between 1.4 and 1.6, and crystallizing the acid. Isonicotinic acid may be recovered from the reaction mixture resulting from oxidation of 4-picoline by substantially the same manner that cinchomeronic acid is recovered except that the pH value of the partially neutralized solution should be adjusted to between 3 and 4, preferably between 3.4 and 3.6.

The following examples are illustrative of my invention. Amounts are given in parts by weight.

Example 1

735 parts of 93% sulfuric acid and 176 parts of quinoline were mixed and the mixture heated to a temperature between 215° and 225° C. Addition of a mixture of 70% nitric acid and 36% hydrochloric acid was then commenced, the mixture containing 670 parts of the nitric acid and 23.7 parts of hydrochloric acid; the nitric acid-hydrochloric acid mixture was gradually added to the reaction mixture over a period of 6 hours, the reaction mixture being maintained at a temperature between 215° and 225° C. At the end of this time the reaction mixture was poured onto ice and sufficient 35% sodium hydroxide solution was added to bring the solution to a pH of about 10. The alkaline solution was agitated with activated carbon for ½ hour, filtered, and acid added until the pH value of the solution had been lowered to 5; the solution was then again treated with activated carbon, filtered and the pH of the filtrate adjusted to between 6 and 7. The filtrate was then heated to between 85° and 90° C. and a solution of copper sulfate was slowly added thereto, after which the mixture was heated at 85° to 90° C. for about ½ hour. Copper nicotinate thus formed was recovered by filtration.

Example 2

735 parts of 93% sulfuric acid, 3.9 parts of selenous acid, 4.76 parts of potassium bromide, and 128 parts of 3-picoline were mixed and the mixture heated to a temperature between 250° and 255° C. Addition of 70% nitric acid to the mixture was then commenced; the acid was added gradually over a period of 5¼ hours, during which time 430 parts were introduced, the temperature being maintained between 250° and 255° C. Upon completion of the reaction, copper nicotinate was recovered as described in Example 1.

Example 3

735 parts of sulfuric acid, 4.76 parts of potassium bromide, 3.2 parts of selenium and 93.1 parts of 2-picoline were mixed and the mixture heated to between 250° and 255° C. Addition of a mixture of 70% nitric acid and 36% hydrochloric acid to the mass was then commenced, the acid mixture containing 710 parts of nitric acid and 29.5 parts of hydrochloric acid; the mixture of acids was gradually added over a period of 4 hours, the temperature being maintained between 250° and 255° C. At the end of this time the reaction mixture was treated as described in Example 1 to recover copper picolinate.

By the term halogen as used herein, is meant those halogens having a molecular weight above 40, and the term halides is similarly employed to denote the halides derived from halogens of the above character, namely chlorine, bromine and iodine as disclosed herein above.

Since certain changes may be made in carrying out the above process without departing from the scope of the invention, it is intended that all matter contained in the above description shall be interpreted as illustrative and not in a limiting sense.

I claim:

1. In the catalytic oxidation to a pyridine carboxylic acid of an N-heteroaryl compound containing a pyridine nucleus containing an oxidizable organic grouping attached to the nitrogen-containing aromatic nucleus by at least one carbon-to-carbon linkage, the improvement which comprises conducting the oxidation by reacting nitric acid with a concentrated sulfuric acid solution of the N-heteroaryl compound and between about 0.5% and about 25% by weight, based on the N-heteroaryl compound, of a substance selected from the group consisting of halogens, hydrogen halides, and halogen-containing compounds which react with sulfuric acid at 50° C. to yield a compound selected from the group of halogens and hydrogen halides, while maintaining the solution at a temperature between about 100° and 300° C., and recovering a compound containing the pyridine carboxylic acid radical.

2. The process of claim 1 wherein the halogen is chlorine.

3. In the catalytic oxidation of quinoline to nicotinic acid, the improvement which comprises conducting the oxidation by adding nitric acid containing between about 50% and about 75% HNO₃ to a solution of quinoline in concentrated sulfuric acid containing between about 0.5% and about 25% by weight, based on the N-heteroaryl compound, of a substance selected from the group consisting of halogens, hydrogen halides, and halogen-containing compounds which react with sulfuric acid at 50° C. to yield a compound selected from the group of halogens and hydrogen halides dissolved in sulfuric acid, and recovering a compound containing the pyridine carboxylic acid radical.

4. In the catalytic oxidation to a pyridine carboxylic acid of an N-heteroaryl compound containing a pyridine nucleus and containing an oxidizable organic grouping attached to the nitrogen-containing aromatic nucleus by at least one carbon-to-carbon linkage, the improvement which comprises conducting the oxidation by reacting nitric acid with a concentrated sulfuric acid solution of the N-heteroaryl compound and, as the sole catalytic material, between about 0.5% and 25% by weight based on the N-heteroaryl compound of a substance selected from the group consisting of halogens, hydrogen halides, and halogen-containing compounds which react with sulfuric acid at 50° C. to yield a compound selected from the group of halogens and hydrogen halides while maintaining the solution at a temperature between about 100° and 300° C., and recovering a compound containing the pyridine carboxylic acid radical.

5. In the catalytic oxidation to a pyridine carboxylic acid of an N-heteroaryl compound containing a pyridine nucleus and containing an oxidizable organic grouping attached to the nitrogen-containing aromatic nucleus by at least one carbon-to-carbon linkage, the improvement which comprises conducting the oxidation by reacting nitric acid with a concentrated sulfuric acid solution, free from selenium catalysts, of the N-heteroaryl compound and between about 0.5% and 25% by weight based on the N-heteroaryl compound of a substance selected from the group consisting of halogens, hydrogen halides, and halogen-containing compounds which react with sulfuric acid at 50° C. to yield a compound selected from the group of halogens and hydrogen halides while maintaining the solution at a temperature between about 100° and 300° C., and recovering a compound containing the pyridine carboxylic acid radical.

MAX B. MUELLER.

REFERENCES CITED

The following references are of record in the file of this patent:

Chemical Reviews, pp. 333–339, vol. 27.